United States Patent Office
3,346,550
Patented Oct. 10, 1967

3,346,550
AZO DYESTUFFS CONTAINING THIOSULFATO-ARYLPYRAZOLONE GROUPS
Gordon A. Geselbracht, Charlotte, N.C., assignor to Martin-Marietta Corporation, a corporation of Maryland
No Drawing. Filed Apr. 11, 1966, Ser. No. 541,514
14 Claims. (Cl. 260—145)

ABSTRACT OF THE DISCLOSURE

There are disclosed herein azo dyestuffs of the group

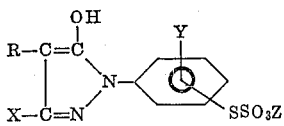

1:1 and 1:2 metal complexes of

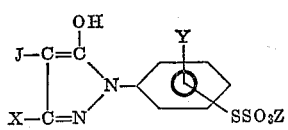

1:1 metal complexes of

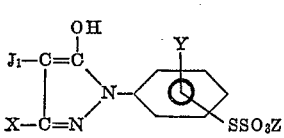

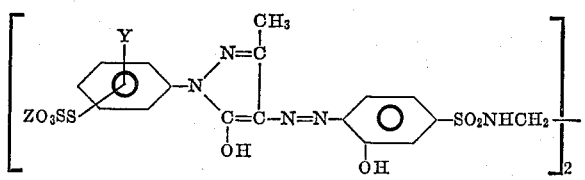

and the metal complex compound resulting from simultaneous reaction of 1 molecular proportion of

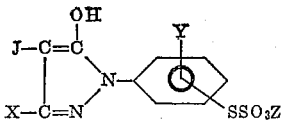

2 molecular proportions of

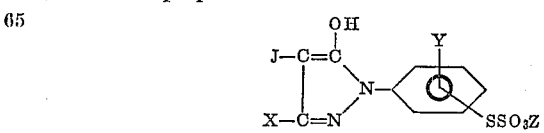

and 2 atomic proportions of Co, Cr or Ni; wherein R is the radical of a diazo compound connected to the C of the pyrazolone by an azo group of said radical; X is the gamma portion of an alpha unsubstituted beta keto acid or ester; Y is H, halogen, lower alkyl, lower alkoxy or the radical of a sultonamide; Z is H, Na, K or $NH_4$; D is an arylene group; J is the radical of a diazo compound having a metallizable substituent on an aromatic portion thereof, a ring C atom of which aromatic portion is linked to the C of the pyrazolone via an azo group of said radical, and the metallizable substituent is ortho to said azo group;

$J_1$ is the radical of a diazo compound connected to the adjoining C of the pyrazolone by an azo group of said radical, said radical having an aromatic portion bearing two metallizable substituents ortho to each other; and in which the —$SO_3Z$ group is meta or para to the N attached to the benzene nucleus.

---

This is a continuation-in-part of my copending United States patent application Serial No. 383,259, filed July 16, 1964, and now abandoned, and the benefit of said filing date is claimed.

The present invention relates to dyestuffs, and more particularly to azo dyestuffs and method for making same.

Generally speaking, the azo dyestuffs of the present invention are particularly characterized in that they are dyestuffs selected from the group consisting of:

(a)

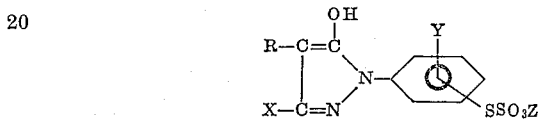

(b)

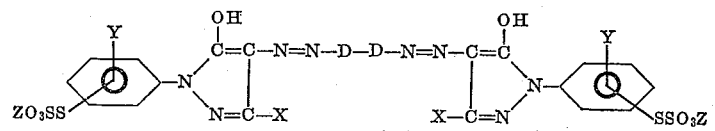

(c) 1:1 copper, 1:1 cobalt, 1:1 chromium, 1:1 nickel, 1:1 iron, 1:2 chromium, 1:2 cobalt, or 1:2 nickel complex compounds of an azo dye of the formula

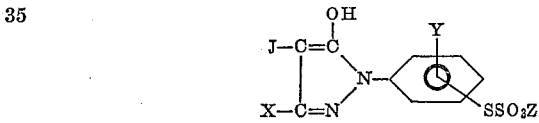

(d) 1:1 copper, 1:1 cobalt, 1:1 chromium, 1:1 nickel, or 1:1 iron complex compounds of an azo dye of the formula

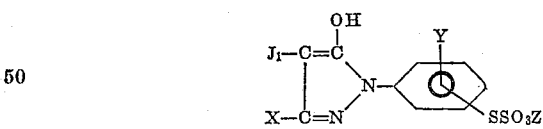

(e) The metal complex compound resulting from simultaneous reaction of 1 molecular proportion of an azo dyestuff of the formula

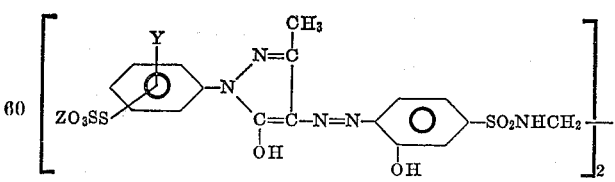

2 molecular proportions of and 2 atomic proportions of Co, Cr, or Ni, said reactants being in solution; wherein R is the radical of a diazo compound connected to the adjoining carbon of the pyrazolone ring by an azo group of said radical of the diazo compound;

X is the gamma portion of an alpha unsubstituted beta keto ester or the gamma portion of an alpha unsubstituted beta keto acid;

Y is hydrogen, halogen, lower alkyl, lower alkoxy, or the radical of a sulfonamide;

Z is H, Na, K, or $NH_4$;

D is an arylene group;

J is the radical of a diazo compound having a metallizable substituent on an aromatic portion thereof, a ring C atom of which aromatic portion is linked to the C atom of the pyrazolone ring via an azo group of the radical of the diazo compound, and in which the metallizable substituent is located ortho to said azo group;

$J_1$ is the radical of a diazo compound connected to the adjoining carbon of the pyrazolone ring by an azo group of said radical of the diazo compound, said radical of the diazo compound being further characterized in having an aromatic portion bearing two metallizable substituents ortho to each other;

and in which the $SSO_3Z$ group is located meta or para with respect to the N attached to the benzene nucleus.

Generally speaking, the method of the present invention is a method for synthesizing an azo dyestuff comprising the step of coupling equimolar proportions of a diazo compound and a pyrazolone compound of the formula

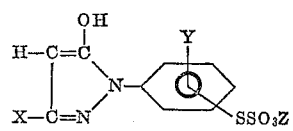

wherein X is the gamma portion of an alpha unsubstituted beta keto ester or the gamma portion of an alpha unsubstituted beta keto acid; Y is hydrogen, halogen, lower alkyl, lower alkoxy, or the radical of a sulfonamide; Z is H, Na, K, or $NH_4$; and the $SSO_3Z$ group is positioned meta or para with respect to the N attached to the benzene nucleus.

If desired, a diazo compound may be utilized which has a metallizable substituent on the aromatic portion thereof which aromatic portion is attached to the terminal azo group, said metallizable substituent being positioned ortho with respect to said terminal azo group. As used herein, the term "terminal azo group" refers to the azo group formed from the amine when a diazotizable aromatic amine is diazotized. When a diazo compound having such metallizable substituent is utilized, the method of the present invention may also comprise reacting a molecular proportion of a solution of the resulting dyestuff with an atomic proportion of copper, cobalt, chromium, nickel or iron, or with 0.5 atomic proportions of chromium, cobalt or nickel to form a metal complex of the azo dyestuff, said metal being an aqueous solution of its salt and said reaction being conducted at an elevated temperature. When 1 atomic proportion of the metal and 1 molecular proportion of the dye are used, a 1:1 metal complex of the azo dye results; and when 0.5 atomic proportion of the metal and 1 molecular proportion of the dye are used, the 1:2 metal complex of the azo dye results.

Alternatively, a diazo compound may be utilized in which an aromatic portion of said diazo compound has two metallizable substituents located ortho to each other, in which case a molecular proportion of the resulting dyestuff may be reacted with an atomic proportion of copper, cobalt, chromium, nickel or iron, said metal being an aqueous solution of its salt, said reactants being in solution, and said metallization reaction being conducted at an elevated temperature. This results in the corresponding 1:1 metal complex of the azo dye.

Another method of the present invention comprises the step of coupling a molecular proportion of a tetrazotized bis(diaryldiamine) with two molecular proportions of a pyrazolone compound of the formula

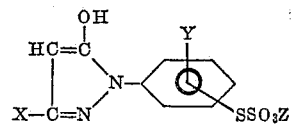

to form an azo dyestuff of the formula

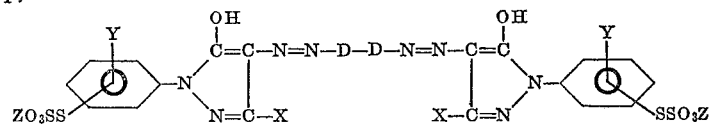

wherein D is an aryl group, such as a radical of the phenylene or naphthylene series, and X, Y, Z and the position of $SSO_3Z$ are as above defined.

The pyrazolone compounds, or dye intermediates, used in making the dyes of the present invention may be represented by the general formula

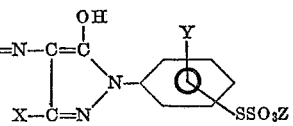

wherein X is the gamma portion of an alpha unsubstituted beta keto ester or the gamma portion of an alpha unsubstituted beta keto acid; Y is hydrogen, halogen, lower alkyl, lower alkoxy, or the radical of a sulfonamide; Z is H, Na, K, or $NH_4$; and the $SSO_3Z$ group is positioned meta or para with respect to the N attached to the benzene nucleus. These compounds are disclosed and claimed in my copending U.S. patent application Serial No. 541,498, filed on even date herewith.

Generally speaking, these pyrazolone compounds may be prepared by a process comprising the steps of diazotizing an amine of the formula

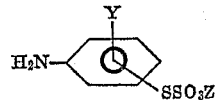

wherein Y and Z are as above defined and the $SSO_3Z$ group is meta or para with respect to the N attached to the benzene nucleus; reacting the resulting diazonium compound with an alkali metal sulfite to form an alkali metal phenylhydrazinesulfonate; acidifying the resulting sulfonate at 0°–35° C. with a strong mineral acid to form a hydrazine; and condensing equimolar proportions of the hydrazine and an alpha unsubstituted beta keto ester or an alpha unsubstituted beta keto acid to form a pyrazolone by ring closure.

It is quite surprising and unexpected that the pyrazolone compounds used in the present invention may be synthesized, as one with skill in the art would expect that the notoriously labile $SSO_3Z$ group of the amine would not remain stable throughout the process, but would decompose, such as by splitting off an —$SO_3Z$ group and forming a mercapto amine, and enter into undesirable side reactions. In fact, the reaction does not proceed, and a tarry residue results, if acidification to form the hydrazine is conducted at a temperature above 35° C. Moreover, if one attempts to diazotize orthoaminothiophenylthiosulfates, the thiosulfate group enters into undesirable side reactions, rendering the process valueless.

A more detailed description for preparing the pyrazolone intermediate follows.

A molecular proportion of an amine of the formula

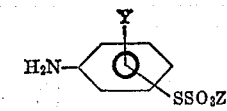

wherein Y and Z are as above defined and the $SSO_3Z$ group is meta or para with respect to the N attached to the benzene nucleus, is diazotized by conventional diazotization technique, such as by dissolving the amine in water, cooling to 0° C., acidifying with HCl, and adding $NaNO_2$ at 0°–10° C. as consumed. The corresponding diazonium salt results.

The resulting diazonium salt is reacted with a molecular proportion of an alkali metal sulfite, such as sodium sulfite, potassium sulfite, or caustic plus a bisulfite which react to form the alkali metal sulfite, to produce the corresponding alkali metal phenylhydrazinesulfonate. This reaction may be effected by stirring an aqueous solution of the above diazonium salt with the alkali metal sulfite at 0°–15° C. for 3–10 hours.

The resulting alkali metal phenylhydrazinesulfonate is then converted to the corresponding hydrazine by acidifying with a strong mineral acid, such as $H_2SO_4$, HCl, and $H_3PO_4$, and preferably $H_2SO_4$ for reasons of economy, and maintaining at 0°–35° C. for 12–48 hours; reaction is complete when the $SO_2$ is liberated. Temperature control in the acidification step is important, as excessive heat causes decomposition.

The resulting hydrazine is then condensed with a molecular proportion of an alpha unsubstituted beta keto ester or alpha unsubstituted beta keto acid. This condensation may be effected by stirring the reactants at 15°–35° C. for 8–48 hours.

Alpha unsubstituted beta keto esters have the formula $R_1$—CO—$CH_2$—$COOR_2$. The $R_1$ is the gamma portion of the ester; the CO is the beta portion of the ester; the $CH_2$ is the alpha portion of the ester; the term alpha unsubstituted refers to the fact that the hydrogens of the $CH_2$ are unsubstituted; and the $COOR_2$ is the carboalkoxy portion of the ester. In these alpha unsubstituted beta keto esters, $R_2$ is an alkyl group and $R_1$ may be carboalkoxy, alkyl, aryl, hydrogen or furyl. Alpha unsubstituted beta keto acids are analagous, except that $R_2$ is H, and except that $R_1$ may also be carboxy.

As a result of the above condensation of the hydrazine and the alpha unsubstituted beta keto ester or acid, the $R_2$ substituent and the adjacent oxygen are split out, along with the amino hydrogens of the hydrazine, to form an $R_2OH$ alcohol and water in the case of the ester, and water in the case of acid, thereby permitting ring closure of the hydrazine and ester or acid, in which the $R_1$ of the ester or acid becomes the X of the pyrazolone compound, and subsequently the corresponding X of the azo dyestuffs of the present invention.

At this stage, the dye intermediates exist in the thiosulfuric acid form, and have the formula

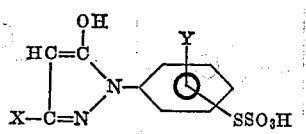

wherein X and Y are as above defined and the $SSO_3H$ group is meta or para to the N attached to the benzene ring.

The above thiosulfuric acid form may be converted to the corresponding thiosulfate salt form ($SSO_3Na$, or $SSO_3K$, or $SSO_3NH_4$) by reacting the acid with an alkali salt of Na, K, or $NH_4$, and the resulting thiosulfate salt may be isolated by evaporating to dryness or salting out.

Non-limiting examples of X in the pyrazolone intermediates and in the compounds of the present invention are hydrogen; a radical of the benzene series, such as phenyl, chlorophenyl, methoxyphenyl, ethoxyphenyl, nitrophenyl and tolyl; naphthyl; furyl; lower alkoxy carbonyl, such as methoxycarbonyl or ethoxycarbonyl; carboxy; and lower alkyl, such as methyl, ethyl, propyl and isopropyl. Alpha unsubstituted beta keto acids, in which the gamma portion is identical to X, or alpha unsubstituted beta keto esters, in which the gamma portion is identical to X except for carboxy, may be used in the present process.

Example 1

The pyrazolone compound of the formula

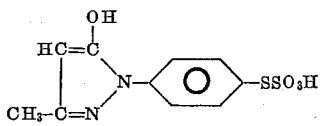

may be prepared as follows.

1 g.m.w. (227 gms.) sodium S-4-aminophenylthiosulfate is diazotized by dissolving in 1,000 ml. $H_2O$ at 35° C., cooling to 0° C., adding 225 gms. 20° Bé. HCl, and adding 69 gms. $NaNO_2$ as consumed. The diazonium salt of sodium S-4-aminophenylthiosulfate results.

A solution of sodium sulfite is prepared by slurrying 230 gms. sodium bisulfite in 500 gms. ice, adding 100 ml. 50% aqueous NaOH, and stirring until the pH adjusts to 7.0. The above resulting diazonium salt of sodium S-4-aminophenylthiosulfate is added to the solution of sodium sulfite gradually during a period of one hour, while maintaining the temperature at 0° C. and the pH at 7.0–7.2 by adding sodium bisulfite or NaOH as needed. The resulting mixture is permitted to stand 12–18 hours, forming a yellowish solution of

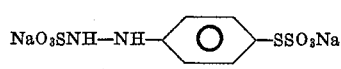

(sodium 4-S-sodiothiosulfatophenylhydrazinesulfonate).

To the above solution of sodium 4-S-sodiothiosulfatophenylhydrazinesulfonate is added, at 20°–25° C., 500 gms. 98% $H_2SO_4$, and the mixture is stirred until all $SO_2$ is liberated, e.g. 20 hours at 20°–30° C. or 48 hours at 0°–10° C., forming

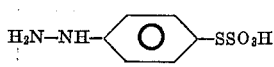

(4-thiosulfatophenylhydrazine).

A slight excess over 1 g.m.w. ethyl acetoacetate is added to the hydrazine, and the mixture stirred 20 hours at 25°–30° C. The resulting solids product is collected by filtration, washed with ice water, and air dried.

In the examples given in the following table, the procedure is the same as that given in Example 1 above, and the examples in the table indicate that a molecular proportion of the thiosulfate salt in the second column is diazotized, the resulting diazo reacted with sodium sulfite and the result acidified to form a hydrazine, and the hydrazine reacted with a molecular proportion of the alpha unsubstituted beta keto ester or acid in the third column to form the pyrazolone compound in the fourth column.

| Ex. No. | Thiosulfate Salt | Ester or Acid | Pyrazolone |
|---|---|---|---|
| 2 | Potassium S-4-aminophenylthiosulfate | Methyl acetoacetate | 1-(4-thiosulfatophenyl)-3-methyl-5-pyrazolone (CH$_3$-C=N, HC=C-OH, N-C$_6$H$_4$-SSO$_3$H) |
| 3 | Ammonium S-4-aminophenylthiosulfate | Isopropyl acetoacetate | 1-(4-thiosulfatophenyl)-3-methyl-5-pyrazolone (CH$_3$-C=N, HC=C-OH, N-C$_6$H$_4$-SSO$_3$H) |
| 4 | Sodium S-4-aminophenylthiosulfate | Butyl acetoacetate | 1-(4-thiosulfatophenyl)-3-methyl-5-pyrazolone (CH$_3$-C=N, HC=C-OH, N-C$_6$H$_4$-SSO$_3$H) |
| 5 | ......do...... | Acetoacetic acid | 1-(4-thiosulfatophenyl)-3-methyl-5-pyrazolone (CH$_3$-C=N, HC=C-OH, N-C$_6$H$_4$-SSO$_3$H) |
| 6 | Sodium S-(2-methyl-3-aminophenyl)thiosulfate | Ethyl propionylacetate | 1-(2-methyl-3-thiosulfatophenyl)-3-ethyl-5-pyrazolone (C$_2$H$_5$-C=N, HC=C-OH, N-C$_6$H$_3$(CH$_3$)-SSO$_3$H) |
| 7 | Sodium S-(3-ethyl-4-aminophenyl)thiosulfate | Ethyl n-butyrylacetate | 1-(3-ethyl-4-thiosulfatophenyl)-3-propyl-5-pyrazolone (C$_3$H$_7$-C=N, HC=C-OH, N-C$_6$H$_3$(C$_2$H$_5$)-SSO$_3$H) |
| 8 | Potassium S-(3-methoxy-5-aminophenyl)thiosulfate | Ethyl benzoylacetate | 1-(3-methoxy-5-thiosulfatophenyl)-3-phenyl-5-pyrazolone (C$_6$H$_5$-C=N, HC=C-OH, N-C$_6$H$_3$(OCH$_3$)-SSO$_3$H) |
| 9 | Sodium S-4-aminophenylthiosulfate | Benzoylacetic acid | 1-(4-thiosulfatophenyl)-3-phenyl-5-pyrazolone (C$_6$H$_5$-C=N, HC=C-OH, N-C$_6$H$_4$-SSO$_3$H) |
| 10 | Sodium S-(2-ethoxy-4-aminophenyl)thiosulfate | Ethyl β-naphthoylacetate | 1-(2-ethoxy-4-thiosulfatophenyl)-3-(β-naphthyl)-5-pyrazolone (β-C$_{10}$H$_7$-C=N, HC=C-OH, N-C$_6$H$_3$(OC$_2$H$_5$)-SSO$_3$H) |
| 11 | Ammonium S-(2-sulfonamido-5-aminophenyl)thiosulfate | Ethyl 2-furoylacetate | 1-(2-sulfonamido-5-thiosulfatophenyl)-3-(2-furyl)-5-pyrazolone (2-furyl-C=N, HC=C-OH, N-C$_6$H$_3$(SO$_2$NH$_2$)-SSO$_3$H) |
| 12 | Sodium S-(2-methylsulfonamido-4-aminophenyl)thiosulfate | Ethyl p-chlorobenzoylacetate | 1-(2-methylsulfonamido-4-thiosulfatophenyl)-3-(p-chlorophenyl)-5-pyrazolone (p-Cl-C$_6$H$_4$-C=N, HC=C-OH, N-C$_6$H$_3$(SO$_2$NHCH$_3$)-SSO$_3$H) |
| 13 | Potassium S-4-aminophenylthiosulfate | Ethyl m-chlorobenzoylacetate | 1-(4-thiosulfatophenyl)-3-(m-chlorophenyl)-5-pyrazolone (m-Cl-C$_6$H$_4$-C=N, HC=C-OH, N-C$_6$H$_4$-SSO$_3$H) |

| Ex. No. | Thiosulfate Salt | Ester or Acid | Pyrazolone |
|---|---|---|---|
| 14 | Sodium S-(3-amino-4-phenylsulfonamidophenyl)thiosulfate. | Ethyl o-anisoylacetate | |
| 15 | Ammonium S-4-aminophenylthiosulfate | Ethyl p-anisoylacetate | |
| 16 | Sodium S-3-aminophenylthiosulfate | Ethyl p-toluylacetate | |
| 17 | Potassium S-4-aminophenylthiosulfate | Ethyl p-ethoxybenzoylacetate | |
| 18 | Sodium S-4-aminophenylthiosulfate | Ethyl formylacetate | |
| 19 | Sodium S-(3-bromo 4-aminophenyl)thiosulfate. | Methyl oxaloacetate | |
| 20 | Potassium S-(2-fluoro-5-aminophenyl)thiosulfate. | Ethyl oxaloacetate | |
| 21 | Sodium S-[4-amino-2-(4'-chlorophenylsulfamyl)]phenylthiosulfate. | Methyl acetoacetate | |
| 22 | Sodium S-[4-amino-3-(4'-tolylsulfamide)]phenylthiosulfate. | ----do---- | |
| 23 | Sodium S-4-aminophenylthiosulfate | Oxalacetic acid | |
| 24 | ----do---- | Oxalacetic acid ethyl ester | |

| Ex. No. | Thiosulfate Salt | Ester or Acid | Pyrazolone |
|---|---|---|---|
| 25 | Sodium S-4-aminophenylthiosulfate | Isobutyrylacetic acid | 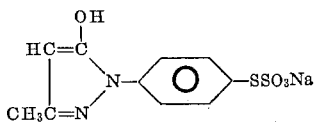 |
| 26 | Sodium S-3-aminophenylthiosulfate | p-Nitrobenzoylacetic acid | 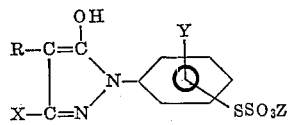 |

The products of the above examples are in the thiosulfuric acid form. These acids may be easily converted to their salts by dissolving them in water, reacting with an equivalent amount of an alkali of Na, K, or $NH_4$ (such as NaOH, $Na_2CO_3$, KOH, $K_2CO_3$, $NH_4OH$, etc.) and evaporating to dryness, in which case the corresponding Na, K or $NH_4$ ion of the alkali replaces the H atom of the thiosulfuric acid. An illustrative example follows.

*Example 27*

The compound of the formula

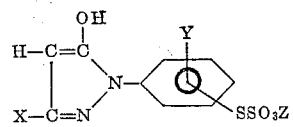

may be prepared by dispersing 1 g.m.w. of the product of Example 1 in 1,000 ml. water at 25° C., adding thereto 0.5 g.m.w. of $Na_2CO_3$ in aqueous form, stirring, evaporating the resulting salt solution to dryness, and collecting the solids product.

Particularly valuable properties of the dye intermediates are that the pendant thiosulfate group serves to render the dyes resulting therefrom water soluble; the thiosulfate group is reducible to the soluble mercaptide form and subsequently oxidizable to the insoluble disulfide form, thus rendering the dyes easily applicable to textiles; and the OH group of the pyrazolone ring is a metallizable substituent, which has great value in dye synthesis.

An azo dyestuff of the formula $$R-C=C(OH)\begin{matrix}\\N-\end{matrix}\langle O \rangle\text{-SSO}_3Z$$
$$X-C=N \qquad Y$$

may be prepared by a process comprising the step of coupling equimolar proportions of a diazo compound with a pyrazolone compound of the formula $$H-C=C(OH)\begin{matrix}\\N-\end{matrix}\langle O \rangle\text{-SSO}_3Z$$
$$X-C=N \qquad Y$$

wherein R is the radical of a diazo compound connected to the adjoining carbon of the pyrazolone ring by an azo group of said diazo compound; X is gamma portion of an alpha unsubstituted beta keto ester or the gamma portion of an alpha unsubstituted beta keto acid; Y is hydrogen, halogen, lower alkyl, lower alkoxy, or the radical of a sulfonamide; Z is H, Na, K, or $NH_4$; and the $SSO_3Z$ group is positioned meta or para with respect to the N attached to the benzene nucleus. Illustrative examples of X in the above dye and in the other dyes of the present invention are hydrogen; furyl; carboalkoxy, such as lower alkoxy carbonyl, methoxycarbonyl, and ethoxycarbonyl; alkyl, such as lower alkyl, methyl, ethyl, and isopropyl; aryl, such as naphthyl, a radical of the benzene series, phenyl, chlorophenyl, methoxyphenyl, ethoxyphenyl, nitrophenyl and tolyl; and carboxy.

The pyrazolone intermediates may be in either the thiosulfuric acid ($SSO_3H$) form or the thiosulfate salt ($SSO_3Na$, $SSO_3K$, or $SSO_3NH_4$) form when coupled with the diazonium salt, and the coupling may be under alkaline, neutral or acid aqueous conditions, although preferably under alkaline. The coupling may be effected by adding an alkali or acid binding agent to the pyrazolone intermediate to bind the free acid, rendering aqueous, and adding thereto a diazonium salt solution; the azo dyestuff results as a solution of the thiosulfate salt, and may be recovered as thiosulfate salt solid by evaporating to dryness or by salting out, or the dye may be recovered as the thiosulfuric acid by rendering the solution slightly acid and collecting the resulting precipitate. The coupling reaction may be conducted at about 0°–20° C., preferably commencing the coupling at about 5° C. and allowing the mass to warm to room temperature during the reaction.

Diazo compounds, with which the pyrazolone intermediates are coupled, are well known. They are prepared by diazotizing a diazotizable aromatic amine (azoic base), many of which diazotizable aromatic amines are listed by common name, chemical name, and structural formula in Lubs, The Chemistry of Synthetic Dyes and Pigments, pp. 196–207, 1955 ed., Reinhold Publishing Corp., New York, N.Y.

The diazo compounds may be devoid of metallizable substituents, or they may have a metallizable substituent on an aromatic portion thereof which metallizable substituent is located ortho to the terminal azo group, or they may have two metallizable substituents on an aromatic portion of the diazo compound which metallizable substituents are located ortho to each other. In that case, the azo dyes may be converted into their metal complex compounds. Illustrative examples of suitable metallizable groups are OH, COOH, and $OCH_2COOH$.

Valuable azo dyestuffs of the formula

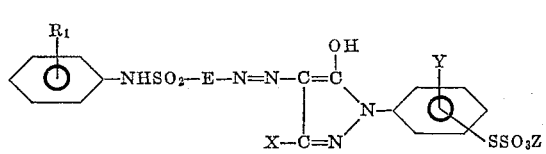

may be prepared by diazotizing an amine of the formula

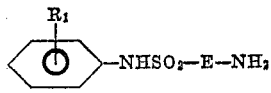

and coupling equimolar amounts of the resulting diazo compound and a pyrazolone compound of the formula

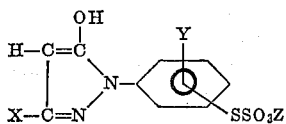

wherein $R_1$ is hydrogen, halogen, lower alkyl, lower alkoxy, or phenoxy; E is a radical of the phenylene or naphthylene series; and X, Y, Z and the position of $SSO_3Z$ are as above defined.

Azo dyes of the formula

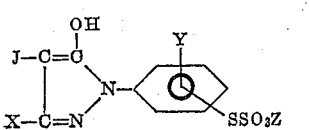

wherein J, X, Y, Z and the position of the $SSO_3Z$ group are as above defined may be prepared by coupling equimolar proportions of a pyrazolone intermediate of the formula

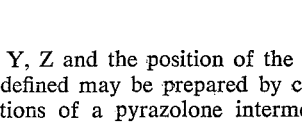

and a diazo compound having a metallizable substituent, such as OH, COOH or $OCH_2COOH$, on the aromatic portion thereof which aromatic portion is attached to the terminal azo group, said metallizable substituent being positioned ortho with respect to said terminal azo group. 1:1 copper, 1:1 cobalt, 1:1 chromium, 1:1 nickel, or 1:1 iron complex compounds of these azo dyes of the formula

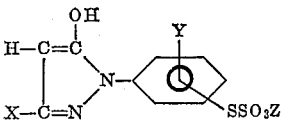

may be prepared by heating an aqueous composition of a molecular proportion of the dye with an atomic proportion of an aqueous solution of Cu, Cr, Co, Ni, or Fe, said metals being a solution of their soluble salts. Reaction is usually complete when the heating is conducted for 1-2 hours. The 1:2 chromium, 1:2 cobalt, or 1:2 nickel complex compounds of these azo dyes may be prepared in similar manner, except that 0.5 atomic proportion of the Cr, Co, or Ni is employed.

Azo dyes of the formula

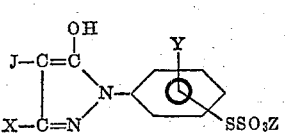

wherein $J_1$, X, Y, Z, and the position of the $SSO_3Z$ group are as above defined, may be prepared by coupling equimolar proportions of a pyrazolone intermediate of the formula

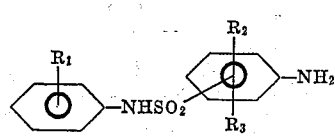

and a diazo compound in which an aromatic portion of the diazo compound has two metallizable substituents located ortho to each other. 1:1 copper, 1:1 cobalt, 1:1 chromium, 1:1 nickel or 1:1 iron complex compounds of thees azo dyes may be prepared by heating an aqueous composition of a molecular proportion of the dye with an atomic proportion of an aqueous solution of Cu, Cr, Co, Ni, or Fe, said metals being a solution of their soluble salts.

An azo dye of the formula

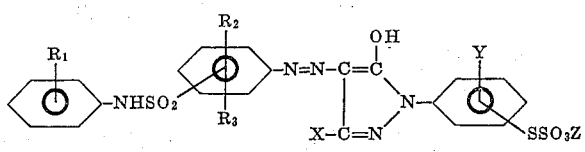

may be prepared by diazotizing an amine of the formula and coupling equimolar proportions of the resulting diazo compound and a pyrazolone compound of the formula

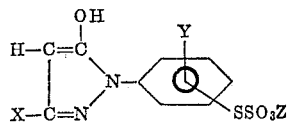

wherein $R_2$ is a metallizable group such as OH, COOH or $OCH_2$ COOH in ortho position to the azo of the dye or to the $NH_2$ in the case of the amine; $R_3$ is in para or meta position to the azo group of the dye or to the $NH_2$ in the case of the amine and is hydrogen, halogen, lower alkyl, or lower alkoxy; the $NHSO_2$ group is located meta or para to the azo group of the dye or to the $NH_2$ in the case of the amine; and $R_1$, X, Y, Z, and the position of the $SSO_3Z$ group are as above defined. 1:1 copper, 1:1 cobalt, 1:1 chromium, 1:1 nickel, or 1:1 iron complex compounds of these azo dyes may be prepared by heating an aqueous composition of a molecular proportion of the dye with an atomic proportion of an aqueous solution of Cu, Cr, Co, Ni or Fe, said metals being a solution of their soluble salts. The 1:2 chromium, 1:2 cobalt, or 1:2 nickel complex compounds of these azo dyes may be prepared in similar manner except that 0.5 atomic proportion of the metal is employed.

Metal complex compounds of azo dyes may also be prepared by heating an aqueous composition comprising 1 molecular proportion of an azo dyestuff of the formula

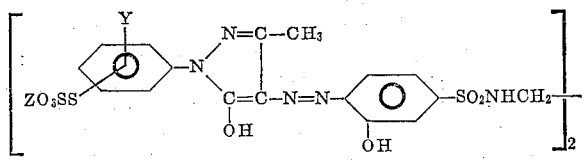

2 molecular proportions of

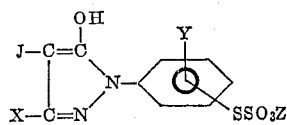

and 2 atomic proportions of an aqueous solution of Co, Cr, or Ni, said metals being a solution of their soluble salts, and the reactants being in solution when they react; wherein J, X, Y, Z and the position of the $SSO_3Z$ group are as above defined.

The

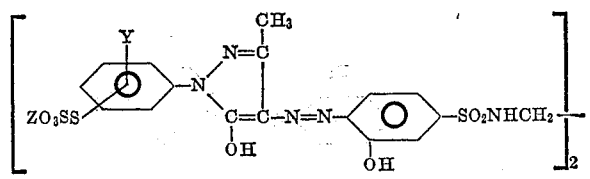

which is used in the above reaction may be prepared by tetrazotizing a molecular proportion of

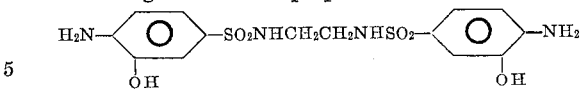

(4,4' - diamino - 3,3'-dihydroxy-ethylene disulfonamide), and coupling the resulting tetrazo compound with 2 molecular proportions of

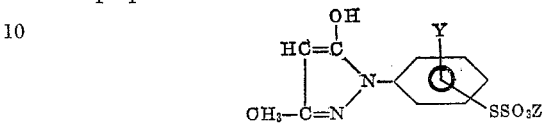

wherein Y, Z and the position of $SSO_3Z$ are as above defined.

If desired, the dyes of the present invention may be converted to their mercaptan (SH) or mercaptide (S-alkali metal) forms by heating with acid or caustic, respectively, at 80°–90° C.

Illutsrative examples follow.

Example 28

The azo dyestuff of the formula

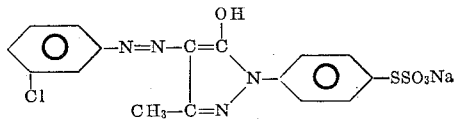

may be prepared as follows.

1 g.m.w. of 3-chloroaniline is diazotized in known manner by adding 1 g.m.w. of 3-chloroaniline to 2,500 ml. water at 25° C., adding thereto 225 gms. concentrated HCl at room temperature with stirring, heating the mixture to 60° C. and stirring until solution results, cooling the solution to 0° C. and holding at that temperature while a slight excess of $NaNO_2$, as shown on starch-KI paper, is added thereto with stirring. A solution of diazotized 3-chloroaniline results.

Equimolar proportions of the diazotized 3-chloroaniline and pyrazolone compound are coupled as follows. 1 g.m.w. of the pyrazolone compound of Example 1 and 600 ml. 20% aqueous $Na_2CO_3$ are dissolved in 2,500 ml. water at 25° C., to which is added 350 gms. $NaHCO_3$, and the mixture cooled to 0° C. While maintaining the solution of pyrazolone compound at 0° C., add thereto gradually, during a period of one hour, with stirring, the above solution of diazotized 3-chloroaniline at 0° C. Stir for 12 hours, allowing the temperature to rise to 20° C., and recover the resulting solids. The product is yellow dye in the form of the sodium thiosulfate salt.

If the potassium thiosulfate salt of the above dye is desired, equivalent amounts of $K_2CO_3$ and $KHCO_3$ may be substituted for the $Na_2CO_3$ and $NaHCO_3$; and if the ammonium thiosulfate salt is desired, equivalent amounts of $NH_4OH$ and $NH_4HCO_3$ may be substituted.

The thiosulfate salt may be converted to the thiosulfuric acid by dissolving in water, rendering slightly acid with HCl at room temperature and collecting the resulting precipitate by filtration.

Examples 29–43M

In the examples given in the following table, the procedure is the same as that given in Example 28, and the examples indicate that a molecular proportion of the diazotizable amine shown in the second column is diazotized and coupled with a molecular proportion of the pyrazolone compound shown in the third column to produce the azo dyestuff shown in the fourth column, which has the shade given in the fifth column. The chemical names and structural formulas for those diazotizable amines which are listed by their common names in the table are given in Lubs, The Chemistry of Synthetic Dyes and Pigments, pp. 196–207, 1955 ed., Reinhold Publishing Corp., New York, N.Y.

| Ex. No. | Diazotizable Amine | Pyrazolone | Azo Dyestuff | Shade |
|---|---|---|---|---|
| 29 | Red KB | | | Yellow. |
| 30 | Red RC | | | Do. |
| 31 | Scarlet G | | | Do. |
| 32 | Scarlet R | | | Do. |
| 33 | Red FG | | | Reddish Yellow. |
| 34 | Red FR | | | Yellow. |

| Ex. No. | Diazotizable Amine | Pyrazolone | Azo Dyestuff | Shade |
|---|---|---|---|---|
| 35 | Red PDC | | | Yellow. |
| 36 | Black K | | | Orange. |
| 37 | Variamine Blue B | | | Bluish Red. |
| 38 | Bordeaux GP | | | Yellow. |
| 39 | Brown V | | | Reddish Orange. |

| Ex. No. | Diazotizable Amine | Pyrazolone | Azo Dyestuff | Shade |
|---|---|---|---|---|
| 40 | Orange GC | | | Yellow. |
| 41 | Violet B | | | Orange. |
| 42 | Yellow GC | | | Yellow. |
| 43 | Sodium S-(4-aminophenyl) thiosulfate | | | Do. |
| 43A | Scarlet GC | | | Do. |
| 43B | 5-hydroxy-2′-methoxysulfanilanilide | | | Do. |
| 43C | 5-hydroxy-2′-ethylsulfanilanilide | | | Do. |

| Ex. No. | Diazotizable Amine | Pyrazolone | Azo Dyestuff | Shade |
|---|---|---|---|---|
| 43D | 5-amino-2′-ethoxy-4-hydroxy-benzenesulfonanilide. | (structure shown) | (structure shown) | Yellow. |
| 43E | 2′-chloro-5-hydroxysulfanilanilide. | K salt of product of Example 6 above. | (structure shown) | Do. |
| 43F | Sulfanilanilide. | NH₄ salt of product of Example 8 above. | (structure shown) | Do. |
| 43G | 4′-phenoxy-sulfanilanilide. | Product of Example 2 above. | (structure shown) | Do. |
| 43H | 5-hydroxy-2-chlorosulfanilanilide. | Product of Example 27 above. | (structure shown) | Do. |
| 43I | 2-amino-benzene-sulfonanilide. | do. | (structure shown) | Do. |
| 43J | 5-amino-4-hydroxy-2-methyl-benzenesulfonanilide. | do. | (structure shown) | Orange. |

| Ex. No. | Diazotizable Amine | Pyrazolone | Azo Dyestuff | Shade |
|---|---|---|---|---|
| 43K | 5-hydroxy-2-methoxy-sulfanilanilide. | Product of Example 27 above | | Orange. |
| 43L | | do | | Yellow. |
| 43M | | do | | Brown. |

The following examples are illustrative of premetallizing azo dyes of the present invention.

Example 44

The azo dye of the formula

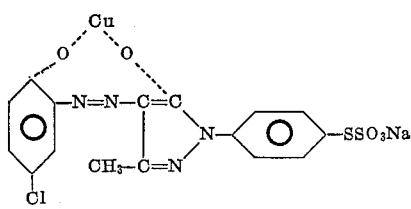

may be prepared as follows.

1 g.m.w. of diazotized 4-chloro-2-aminophenol is coupled to 1 g.m.w. of the product of Example 27 to form a non-metallized dyestuff of the formula

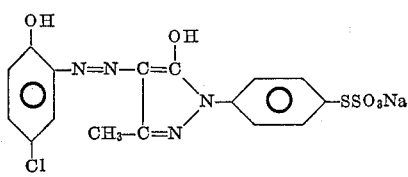

which is added to 10 liters of water and heated to 80° C. To it is added a copper sulphate solution which has been prepared by dissolving 249.71 gms. copper sulphate pentahydrate in 3 liters of water at 90° C., cooling to 25° C., and redissolving with 1,000 gms. 28% aqueous ammonia. The result is heated at 80° C. for 2 hours, and the tan metallized dyestuff separates on salting with NaCl.

Example 45

The azo dye of the formula

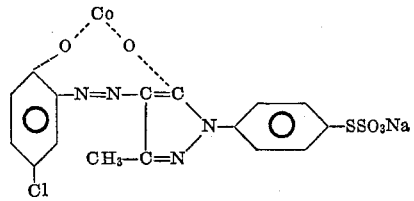

may be prepared as follows.

1 g.m.w. of the non-metallized dyestuff of Example 44 above is added to 10 liters water, and heated to 80° C. To it are added 281.1 gms. $CoSO_4 \cdot 7H_2O$ dissolved in 3 liters water, and the result heated to 80° C. for 2 hours. The tan metallized dyestuff separates on salting with NaCl.

Example 46

The azo dye of the formula

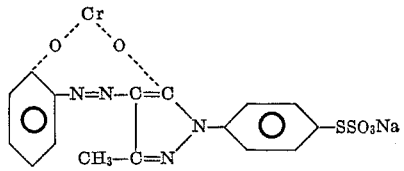

may be prepared as follows.

1 g.m.w. of the non-metallized dyestuff of Example 44 is added to 10 liters water at 60° C. To it are added 594 gms. of a 50% aqueous solution of chromium acetate monohydrate; and the composition is heated at 80° C. for 2 hours while maintaining pH 7. The red metallized dyestuff separates on salting with NaCl.

Example 47

The azo dye of the formula

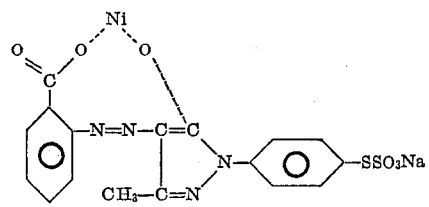

may be prepared as follows.

1 g.m.w. of diazotized o-aminobenzoic acid is coupled with 1 g.m.w. of the product of Example 27 to form a non-metallized azo dye of the formula

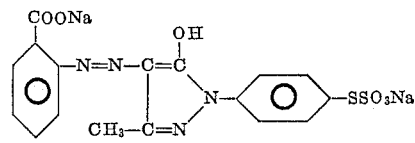

and 1 g.m.w. thereof is added to 10 liters water and heated to 80° C. To it are added 262.85 gms. $NiSO_4 \cdot 6H_2O$ dissolved in 3 liters water. The composition is heated at 80° C. for 2 hours. The yellow metallized dyestuff separates on salting with NaCl.

Example 48

The azo dye of the formula

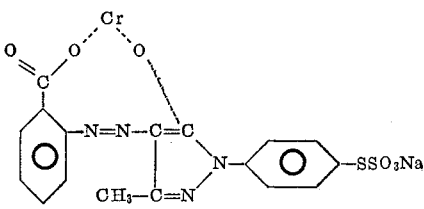

may be prepared as follows.

1 g.m.w. of the non-metallized dye of Example 47 above is added to 10 liters water and heated to 60° C. To it is added 594.32 gms. of a 50% aqueous solution of chromium acetate monohydrate. The composition is heated at 80° C. for 2 hours. The yellow metallized dyestuff separates on salting with NaCl.

Example 49

The azo dye of the formula

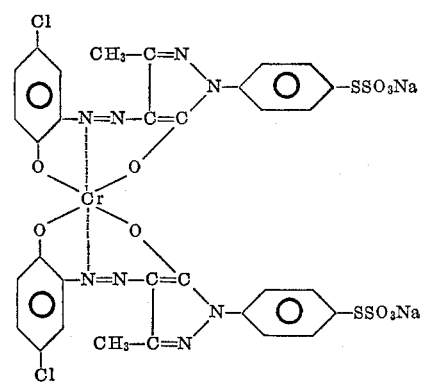

may be prepared as follows.

2 g.m.w. of the non-metallized dyestuff of Example 44 above are added to 20 liters water at 60° C. To it are added 594.32 gms. of a 50% aqueous solution of chromium acetate monohydrate, and the composition is heated at 80° C. for 2 hours while maintaining pH 7. The red metallized dyestuff separates on salting with NaCl.

The 1:2 cobalt complex analog of the above dye may be prepared by substituting 140.5 gms. $CoSO_4 \cdot 7H_2O$ dissolved in 1.5 liters water for the chromium acetate solution used above.

The 1:2 nickel complex analog of the above dye may be prepared by substituting 131.42 gms. NiSO$_4$·6H$_2$O dissolved in 1.5 liters water for the chromium acetate solution used above.

*Example 50*

The azo dye of the formula

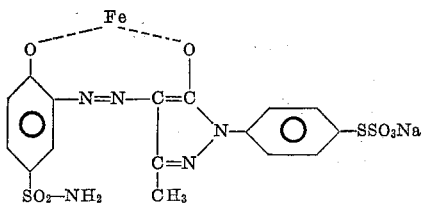

may be prepared as follows.

1 g.m.w. of diazotized 2-aminophenol-4-sulfonamide is coupled with 1 g.m.w. of the product of Example 27 to produce a non-metallized dyestuff of the formula

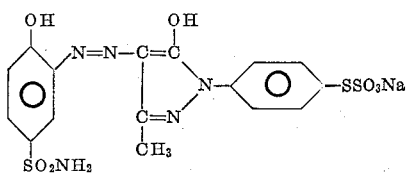

1 g.m.w. of this dyestuff is premetallized by adding thereto 10 liters water and also 162.21 gms. FeCl$_3$ dissolved in 3 liters water; heating to 80° C.; and holding at 80° C. for 2 hours while maintaining pH 7 by adding caustic soda as needed. The resulting olive dyestuff separates on salting with NaCl.

*Example 50A*

The azo dye of the formula

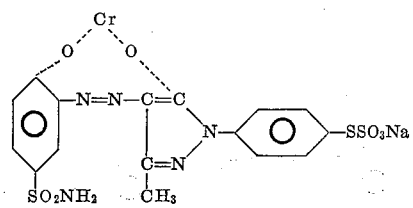

may be prepared as follows.

This example is the same as Example 50 above, except that 1 g.m.w. of the non-metallized dyestuff of Example 50 is premetallized by adding to 10 liters water, heating to 60° C., adding thereto 594.32 gms. of a 50% aqueous solution of chromium acetate monohydrate, and heating at 80° C. for 2 hours. The orange metallized dyestuff separates on salting with NaCl.

*Example 50B*

The azo dye of the formula

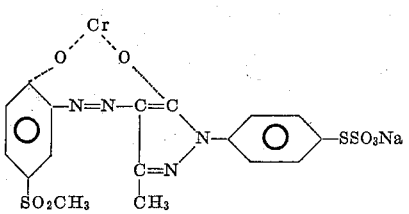

may be prepared as follows.
1 g.m.w. of diazotized

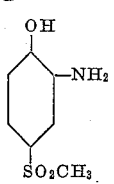

and the pyrazolone intermediate of Example 27 above, both in aqueous solution, are coupled at 5°–10° C.

The resulting dye is adjusted to 10 liters aqueous volume, 594.32 gms. of a 50% aqueous solution of chromium acetate monohydrate is added, the pH adjusted to 6.5 with acetic acid, the mixture heated to 85° C., and heating is continued at 85°–90° C. for 4 hours, while the pH is maintained at 6.4–6.7. The orange metallized dyestuff precipitates on salting with NaCl.

*Example 51*

The azo dye of the formula

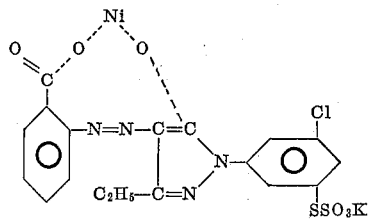

may be prepared as follows.

1 g.m.w. of diazotized o-aminobenzoic acid is coupled with 1 g.m.w. of

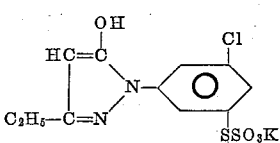

to form a non-metallized dye of the formula

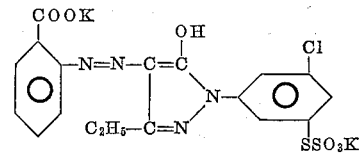

and 1 g.m.w. thereof is reacted with 262.85 gms.

NiSO$_4$·6H$_2$O in the manner described in Example 47 above. The yellow metallized dyestuff results on evaporating to dryness.

*Example 52*

The azo dye of the formula

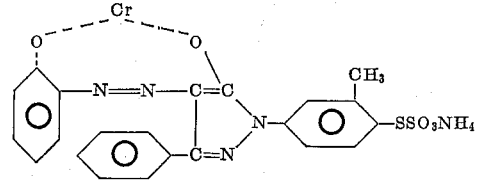

may be prepared as follows.

1 g.m.w. of diazotized 2-aminophenol is coupled to 1 g.m.w. of

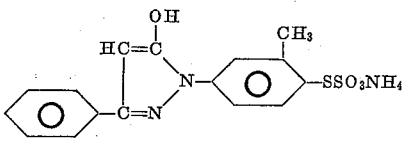

to form a non-metallized dyestuff of the formula

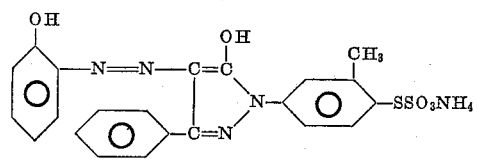

and 1 g.m.w. thereof is reacted with 594 gms. of a 50% solution of chromium acetate in the manner described in Example 48 above. The orange metallized dyestuff results on evaporating to dryness.

Example 53

The azo dye of the formula

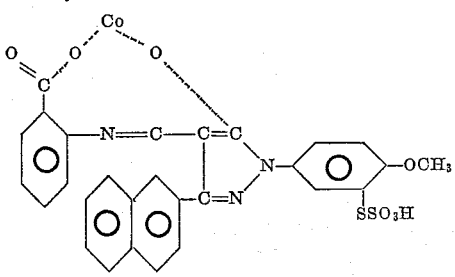

may be prepared as follows.

1 g.m.w. of diazotized o-aminobenzoic acid is coupled with 1 g.m.w.

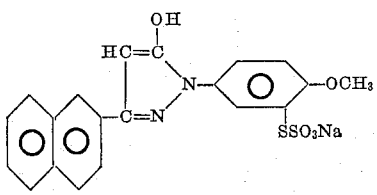

and the result rendered slightly acid with 10% HCl at 25° C., to precipitate a non-metallized dye of the formula

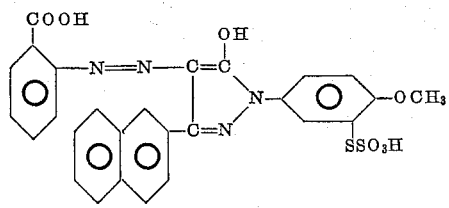

and 1 g.m.w. thereof is reacted with 281.1 gms.

in the manner described in Example 45. The yellow metallized dye is isolated by evaporating to dryness.

Example 54

The azo dye of the formula

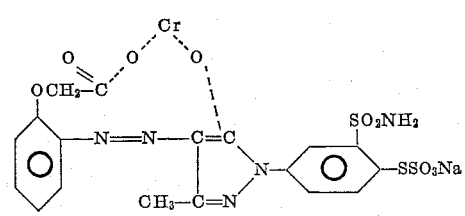

may be prepared as follows.

1 g.m.w. of diazotized 2-aminophenoxyacetic acid is coupled with 1 g.m.w. of

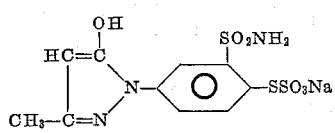

to form the non-metallized dye of the formula

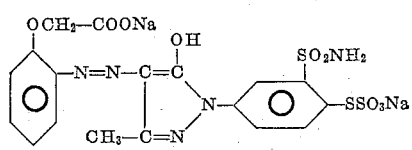

and 1 g.m.w. thereof is reacted with 594 gms. of 50% chromium acetate monohydrate in the manner described in Example 48. The yellow metallized dyestuff separates on salting with NaCl.

Example 55

The azo dye of the formula

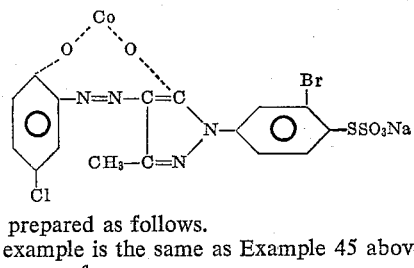

may be prepared as follows.

This example is the same as Example 45 above, except that 1 g.m.w. of

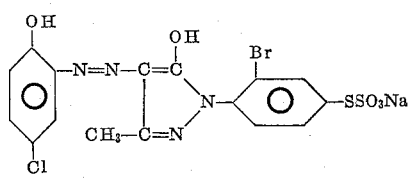

is substituted for the non-metallized dyestuff used in Example 45.

The resulting metallized dye is orange.

Example 56

The azo dye of the formula

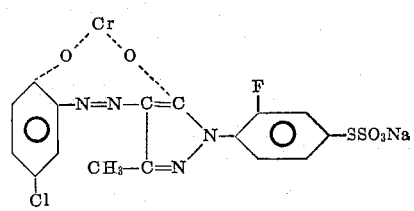

may be prepared as follows.

This example is the same as Example 46 above, except that 1 g.m.w. of

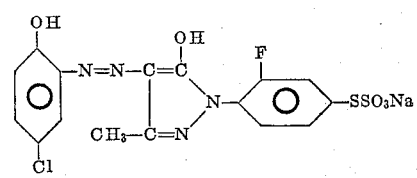

is substituted for the non-metallized dyestuff used in Example 46.

The resulting metallized dye is orange.

Example 56A

The orange brown premetallized azo dyestuff of the formula

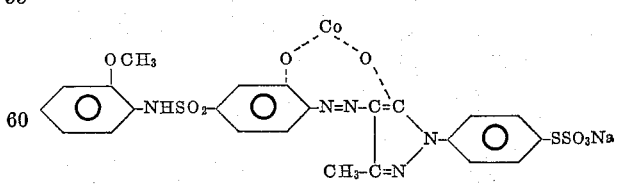

may be prepared as follows. The dyestuff has more than 40 hours light fastness when applied to cotton in medium depth shade, which is surprising and unexpected for azo dyes having pendant thiosulfate groups.

1 g.m.w. of the non-metallized azo dyestuff of Example 43B above is dissolved in 10 liters water, 281.1 gms. CoSO₄·7H₂O dissolved in 3 liters water is added thereto, the pH is adjusted to 6.7 with soda ash, the mixture is heated to 95° C. and held at that temperature for 6 hours, while maintaining pH 6.5–7 with soda ash or acetic acid as required. Cool to 45° C., and the dyestuff precipitates on addition of NaCl.

Example 56B

The scarlet premetallized azo dyestuff of the formula

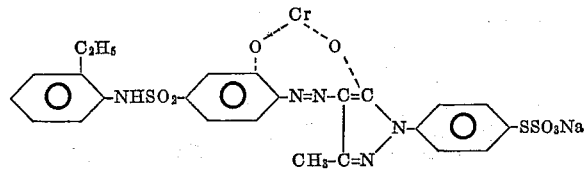

may be prepared as follows.

1 g.m.w. of the non-metallized azo dyestuff of Example 43C is dissolved in 10 liters water, and 594.32 gms. of a 50% aqueous solution of chromium acetate monohydrate is added thereto. The pH is adjusted to 6.9 with soda ash or acetic acid as required. The mixture is heated to 95° C. overnight to insure completion of metallization, while maintaining the pH at 6.8–7. The dyestuff precipitates on adding NaCl.

Example 56C

The yellow brown premetallized azo dyestuff of the formula

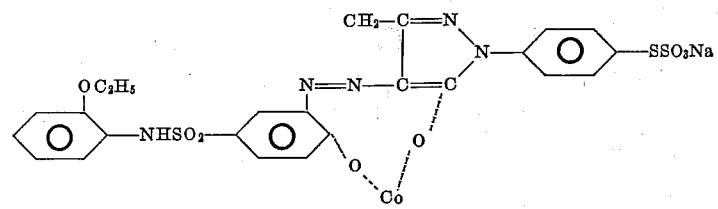

may be prepared as follows.

1 g.m.w. of the non-metallized azo dyestuff of Example 43D is dissolved in 15 liters water, 281.1 gms. $CoSO_4 \cdot 7H_2O$ dissolved in 3 liters water is added thereto, and the pH is adjusted to 6.7 with soda ash. The mixture is heated 5–6 hours at 95° C. to insure completion of metallization, while maintaining the pH at 6.5–7 with soda ash or acetic acid as required. The dye precipitates on salting with NaCl.

The resulting dyestuff has more than 40 hours light fastness and excellent wash fastness when applied to cotton in medium depth shade, which is surprising for dyes of this type.

The 1:1 nickel complex analog of the above dye may be prepared by substituting 262.85 gms. $NiSO_4 \cdot 6H_2O$ dissolved in 3 liters water for the $CoSO_4$ solution used above.

The 1:1 copper complex analog of the above dye may be prepared by substituting the copper sulphate solution described in Example 44 above for the $CoSO_4$ solution used above, and lowering the metallization temperature to 65° C.

The 1:1 iron complex analog of the above dye, may be prepared by substituting 162.21 gms. $FeCl_3$ dissolved in 3 liters water for the $CoSO_4$ solution used above.

Example 56D

The 1:2 premetallized azo dye of the formula

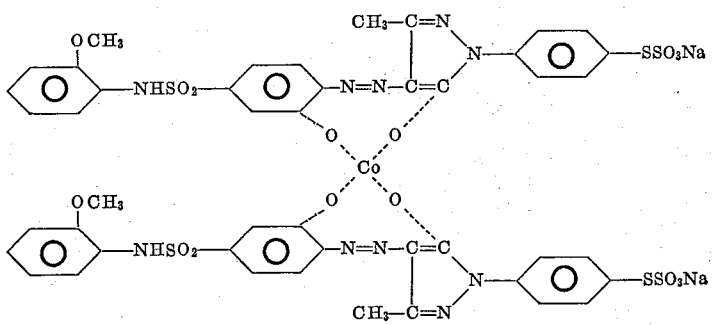

may be prepared by the process described in Example 56A above, except that the amount of $CoSO_4$ solution used in Example 56A is reduced by one-half. A brown dyestuff results.

Example 56E

The 1:2 chromium complex compound of the azo dye of Example 43C above may be prepared in the same manner as described in Example 56B above, except that the amount of chromium acetate solution used in Example 56B is reduced by one-half. A scarlet dyestuff results.

Example 56F

The 1:2 nickel complex compound of the azo dyestuff of Example 43D above, may be prepared by dissolving 1 g.m.w. of the dye of 43D in 10 liters water, adding 131.42 gms. $NiSO_4 \cdot 6H_2O$ dissolved in 3 liters water, adjusting to pH 6.5, and heating 6–8 hours at 90°–95° C. while maintaining pH 6.5–7. The orange premetallized dyestuff separates on salting with NaCl.

Example 57

The dyestuff of the formula

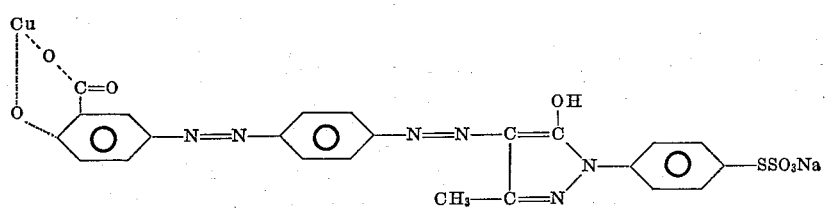

may be prepared as follows.

1 g.m.w. of salicylic acid is coupled with 1 g.m.w. of diazotized p-nitroaniline, and the result reduced with 2.1 g.m.w. Na₂S to form

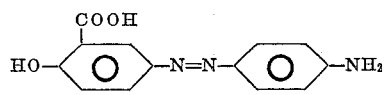

and 1 g.m.w. thereof is diazotized at 20° C. and the diazo coupled with 1 g.m.w. of

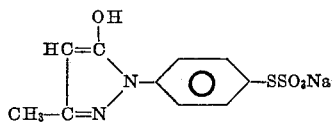

to form a non-metallized dyestuff.

The non-metallized dyestuff is dissolved in 10 liters water at 50° C., and a slight excess over 1 g.m.w. CuSO₄·5H₂O, dissolved in 1 liter of water, and 300 gms. sodium acetate are added thereto. The composition is heated to 60° C. for 1 hour; the brown metallized dye precipitates and may be recovered by filtration.

*Example 57A*

The 1:1 cobalt analog of the metallized dyestuff of Example 57 above may be prepared by metallizing 1 g.m.w. of the non-metallized dyestuff of Example 57 by the metallization method described in Example 45 above, except that the heating to metallize is at 95° C. instead of 80° C.

*Example 57B*

The 1:1 chromium analog of the metallized dyestuff of Example 57 above may be prepared by metallizing 1 g.m.w. of the non-metallized dyestuff of Example 57 by the metallization method described in Example 46 above, except that the heating to metallize is at 95° C. instead of 80° C.

*Example 57C*

The 1:1 nickel analog of the metallized dyestuff of Example 57 above may be prepared by metallizing 1 g.m.w. of the non-metallized dyestuff of Example 57 by the metallization method described in Example 47 above.

*Example 57D*

The 1:1 iron analog of the metallized dyestuff of Example 57 above may be prepared by metallizing 1 g.m.w. of the non-metallized dyestuff of Example 57 by the metallizing method described in Example 50 above.

*Example 57E*

The non-metallized azo dyestuff of the formula

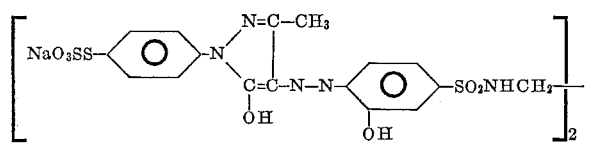

may be prepared by tetrazotizing 1 g.m.w. of

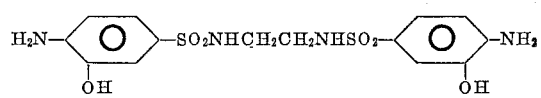

in conventional manner with water, muriatic acid and sodium nitrite at 0° C.; and coupling the resulting aqueous tetrazo with 2 g.m.w. of the product of Example 27 above by adding the tetrazo to an aqueous solution of the product of Example 27 at 0° C. and stirring overnight to complete the coupling. The non-metallized dyestuff precipitates on addition of NaCl, and is collected by filtration.

*Example 57F*

The non-metallized azo dyestuff of the formula

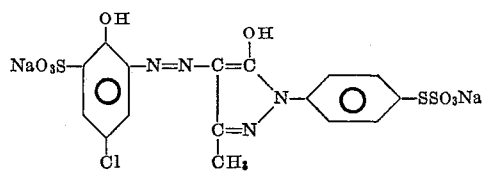

may be prepared by diazotizing 1 g.m.w. of 4-chlor-2-aminophenol-6-sulfonic acid and coupling the resulting diazo solution with an aqueous solution of 1 g.m.w. of the product of Example 27 adjusted to pH 7 with soda ash, commencing the coupling reaction at 0° C. and stirring overnight while permitting the temperature to rise to 20°–25° C. The dyestuff precipitates on addition of NaCl, and is collected by filtration.

*Example 57G*

The scarlet premetallized azo dyestuff of the formula

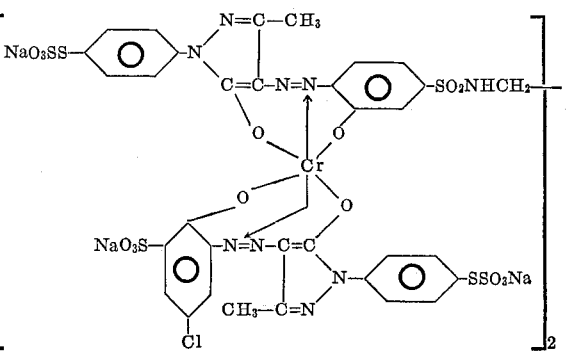

may be prepared as follows.

1 g.m.w. of the non-metallized dyestuff of Example 57E above and 2 g.m.w. of the dyestuff of Example 57F are stirred into 20 liters water. 1188.64 gms. of a 50% aqueous solution of chromium acetate monohydrate is added; the pH is adjusted to 6.5 with NaOH; following which the aqueous composition is heated at 95° C. for 6 hours, while the pH is maintained at 6.0–6.5 with NaOH. The product is cooled to 50° C., NaCl is added to precipitate it, following which it is collected by filtration.

*Example 57H*

The cobalt analog of the metallized azo dye of Example 57G may be prepared in the same manner as described in Example 57G, except that 562.2 gms. CoSO₄·7H₂O dissolved in 6 liters water is substituted for the chromium acetate solution. The resulting dye is scarlet.

*Example 57I*

The nickel analog of the metallized azo dye of Example 57G above may be prepared in the same manner as described in Example 57G, except that 535.70 gms.

NiSO₄·6H₂O dissolved in 6 liters water is substituted for the chromium acetate solution, and except that the heating is at 80° C. A scarlet dyestuff results.

Example 57J

The orange metallized azo dyestuff of the formula

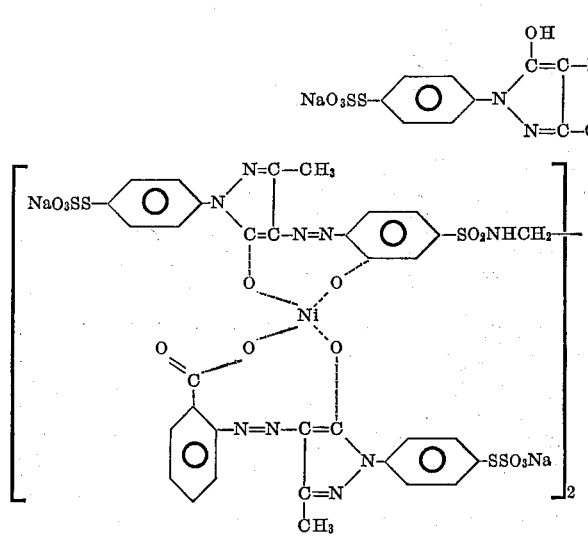

may be prepared in the same manner as described in Example 57I above, except that 2 g.m.w.

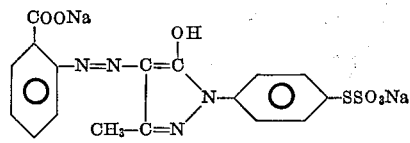

is substituted for the dye of Example 57F which is used in Example 57I.

The azo dyestuffs of the present invention may also be prepared by coupling a molecular proportion of a tetrazotized bis(diaryldiamine) with two molecular proportions of a pyrazolone compound of the formula

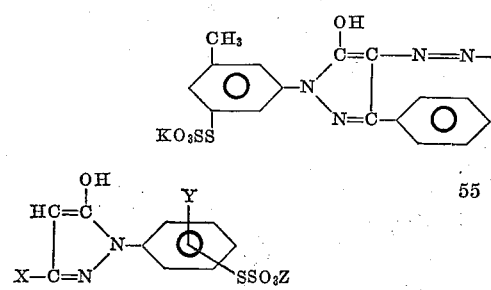

to produce a pyrazolone compound of the formula

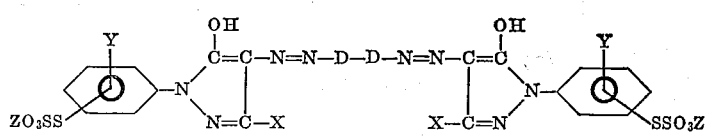

wherein D is an arylene group, such as phenylene, substituted phenylene, naphthylene, or substituted naphthylene, and X, Y, and Z are as above defined and the $SSO_3Z$ groups are meta or para with respect to the pyrazolonyl groups, that is meta or para with respect to the N attached to the benzene nucleus to which the $SSO_3Z$ group in question is attached. Several examples follow.

Example 58

The azo dyestuff of the formula

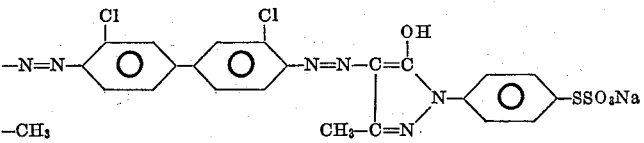

may be prepared by coupling 1 g.m.w. of tetrazotized 3,3'-dichlorobenzidine with 2 g.m.w. of the product of Example 27. The coupling is effected by adding the tetrazo at 0°–5° C. to a solution of the pyrazolone at 0°–5° C. containing 300 gms. sodium bicarbonate to neutralize the acid liberated during the coupling, and holding at 0°–5° C. for 20 hours.

The resulting dyestuff is orange.

Example 59

The azo dyestuff of the formula

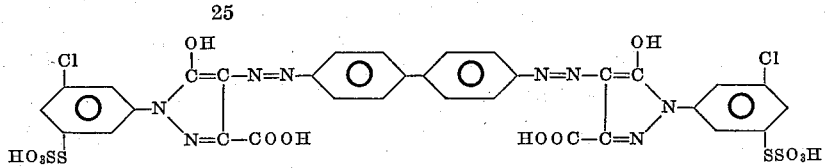

may be prepared by coupling 1 g.m.w. of tetrazotized benzidine with 2 g.m.w. of

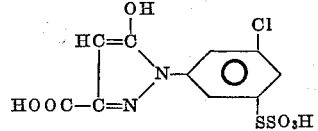

The coupling may effected as described in Example 58, and the salt then converted to acid by adding HCl until acid to Congo paper.

The resulting dyestuff is orange.

Example 60

The azo dyestuff of the formula

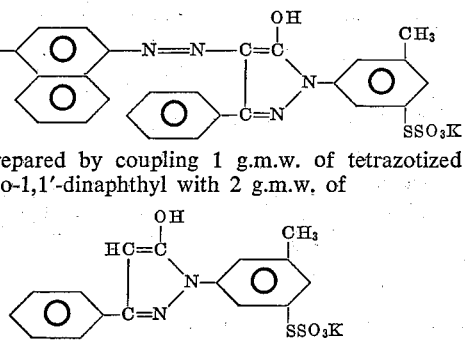

may be prepared by coupling 1 g.m.w. of tetrazotized 4,4'-diamino-1,1'-dinaphthyl with 2 g.m.w. of

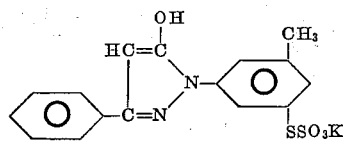

The coupling may be effected as described in Example 58, except that an equivalent amount of $KHCO_3$ is substituted for the $NaHCO_3$ used in Example 58.

The resulting dyestuff is orange.

Example 61

The azo dyestuff of the formula

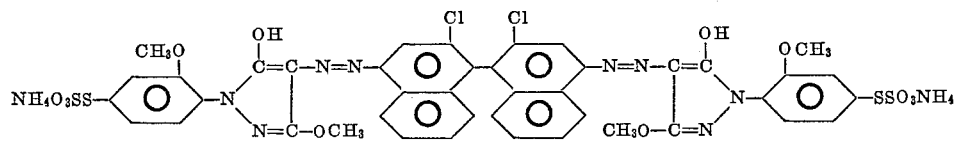

may be prepared by coupling 1 g.m.w. of tetrazotized 4,4′-diamino-2,2′-dichloro-1,1′-dinaphthyl with 2 g.m.w. of

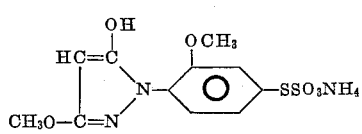

The coupling may be effected as described in Example 58, except that an equivalent amount of $NH_4HCO_3$ is substituted for the $NaHCO_3$ used in Example 58.

The resulting dyestuff is orange.

Example 62

The azo dyestuff of the formula

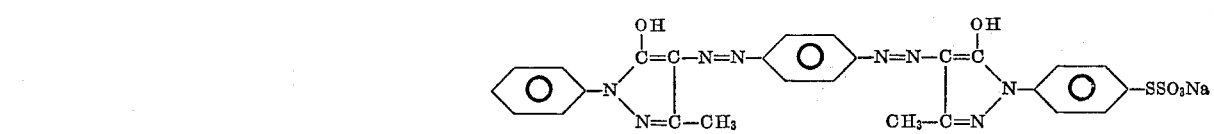

may be prepared by coupling 1 g.m.w. of tetrazotized 4,4′-diamino-2,2′-dimethyldiphenyl with 2 g.m.w. of

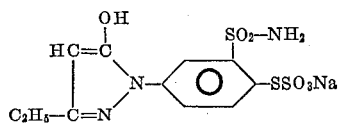

The coupling may be effected as described in Example 58.

The resulting dyestuff is reddish orange.

Example 63

The azo dyestuff of the formula

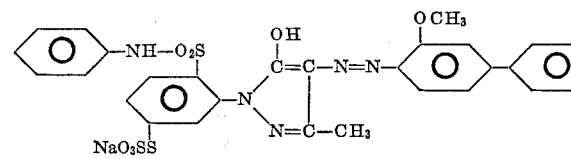 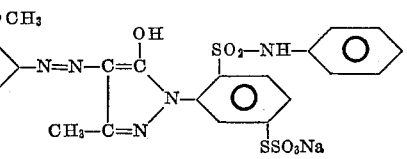

may be prepared as follows.

This example is the same as Example 62 above, except that 1 g.m.w. of tetrazotized 4,4′-diamino-3,3′-dimethoxydiphenyl is substituted for the tetrazotized 4,4′-diamino-2,2′-dimethyldiphenyl of Example 63, and except that 2 g.m.w. of

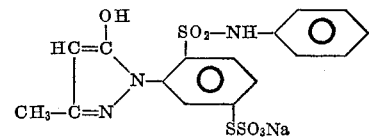

are substituted for the pyrazolone intermediate used in Example 62.

The resulting dyestuff is red.

Example 64

The azo dyestuff of the formula

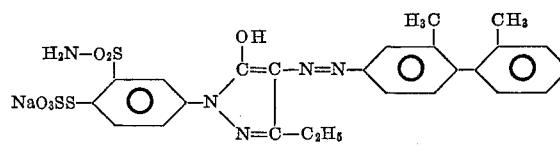 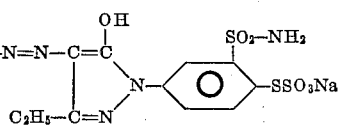

may be prepared by coupling 1 g.m.w. of diazotized p-nitroaniline to 1 g.m.w. of 1-phenyl-3-methyl-5-pyrazolone, reducing the nitro group of the resulting product to an amine with 210 gms. of a 40% aqueous solution of sodium sulfhydrate, diazotizing the amine, and coupling 1 g.m.w. of the resulting diazo compound with 1 g.m.w. of the product of Example 27 by adding the diazo solution at 0° C. to a solution of the pyrazolone at 5° C. containing 300 gms. sodium bicarbonate to neutralize the acid liberated during coupling, and holding at 20° C. for 24 hours.

The resulting dyestuff is scarlet.

The thiosulfate salt dyes of the present invention may be applied to cotton fabric by padding onto the fabric at 140° F. a dye solution consisting of 20 parts dye, 100 parts thiourea, 2 parts sodium alginate migration inhibitor, and 878 parts water; squeezing to 60% wet pick up based on fabric weight; pre-drying to 10% moisture content; and heating in a curing oven at 400° F. for 1 minute to fix the dye.

The thiosulfuric acid form dyes of the present invention may be used to dye wool by the commonly known method of applying acid dyes to wool. Valuable wet fast dyeings result.

What is claimed is:

1. A dyestuff selected from the group consisting of:

(a)

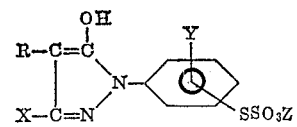

(b)

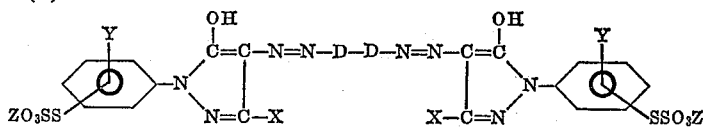

(c) 1:1 copper, 1:1 cobalt, 1:1 chromium, 1:1 nickel, 1:1 iron, 1:2 chromium, 1:2 cobalt, or 1:2 nickel complex compounds of an azo dye of the formula

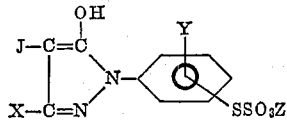

(d) 1:1 copper, 1:1 cobalt, 1:1 chromium, 1:1 nickel, or 1:1 iron complex compounds of an azo dye of the formula

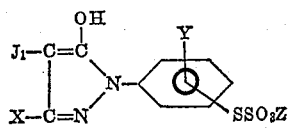

and (e) the metal complex compound resulting from simultaneous reaction of 1 molecular proportion of an azo dyestuff of the formula

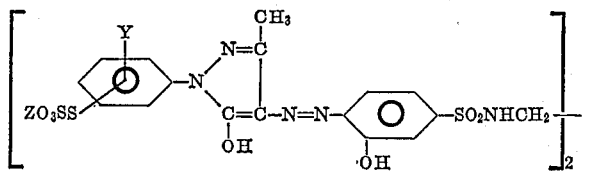

2 molecular proportions of

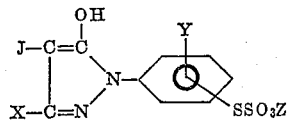

and 2 atomic proportions of Co, Cr, or Ni, said reactants being in solution; wherein:

R is the radical of a diazo compound of the benzene or naphthylene series connected to the adjoining carbon of the pyrazolone ring by an azo group of said radical of the diazo compound;

X is hydrogen, phenyl, chlorophenyl, methoxyphenyl, ethoxyphenyl, nitrophenyl, tolyl, naphthyl, furyl, methoxycarbonyl, ethoxycarbonyl, carboxy, methyl, ethyl, propyl or isopropyl;

Y is hydrogen, halogen, methyl, ethyl, methoxy, ethoxy, —SO₂NH₂, —SO₂NHCH₃,

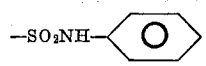

Z is H, Na, K, or NH₄;

D is an arylene group of the naphthylene or phenylene series;

J is the radical of a diazo compound of the benzene series having a metallizable substituent on an aromatic portion thereof, a ring C atom of which aromatic portion is linked to the C atom of the pyrazolone ring via an azo group of the radical of the diazo compound, and in which the metallizable substituent is located ortho to said azo group;

J₁ is the radical of a diazo compound of the benzene series connected to the adjoining carbon of the pyrazolone ring by an azo group of said radical of the diazo compound, said radical of the diazo compound being further characterized in having an aromatic portion bearing two metallizable substituents ortho to each other;

and in which the SSO₃Z group is located meta or para with respect to the N attached to the benzene nucleus.

2. A dyestuff as defined in claim 1, and further characterized in that X is methyl; Y is hydrogen; J₁ is

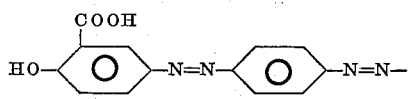

and in that the —SSO₃Z group is located para with respect to the N attached to the benzene nucleus.

3. A dyestuff as defined in claim 1, and further characterized in that D is phenylene, chlorophenylene, methylphenylene, methoxyphenylene, naphthylene, or chloronaphthylene.

4. A dyestuff selected from the group consisting of:

(a)

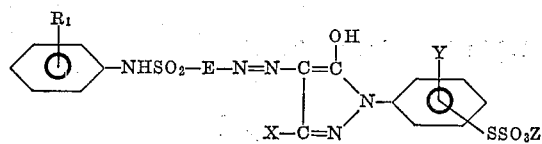

and (b) 1:1 copper, 1:1 cobalt, 1:1 chromium, 1:1 nickel, 1:1 iron, 1:2 chromium, 1:2 cobalt, or 1:2 nickel complex compounds of an azo dye of the formula

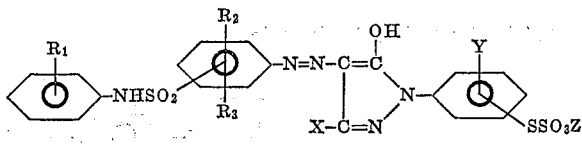

in which the NHSO₂ group is located meta or para to the azo group; wherein:

X is hydrogen, phenyl, chlorophenyl, methoxyphenyl, ethoxyphenyl, nitrophenyl, tolyl, naphthyl, furyl, methoxycarbonyl, ethoxycarbonyl, carboxy, methyl, ethyl, propyl or isopropyl;

Y is hydrogen, halogen, methyl, ethyl, methoxy, ethoxy, —SO₂NH₂, —SO₂NHCH₃

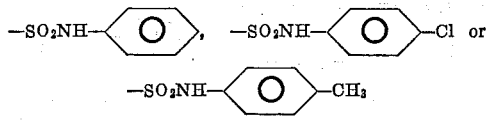

Z is H, Na, K, or NH₄;

R₁ is hydrogen, halogen, lower alkyl, lower alkoxy, or phenoxy;

E is a radical of the phenylene or naphthylene series;

R₂ is a metallizable group in ortho position to the azo group;

R₃ is in para or meta position to the azo group and is hydrogen, halogen, lower alkyl, or lower alkoxy;

and in which the SSO₃Z group is in meta or para position to the N attached to the benzene nucleus.

5. The dyestuff of the formula
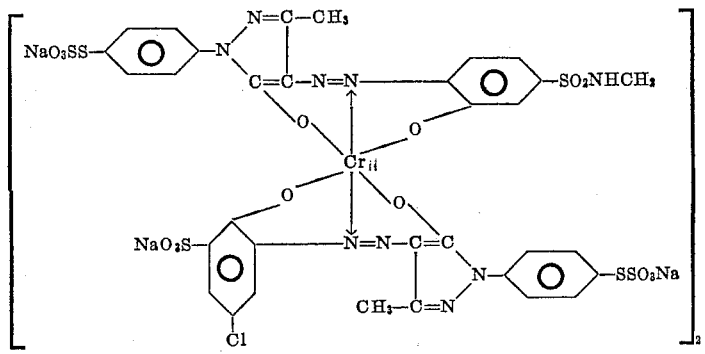
6. The dyestuff of the formula
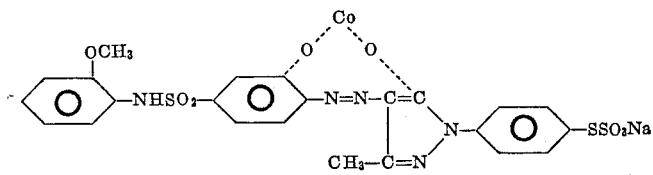
7. The dyestuff of the formula
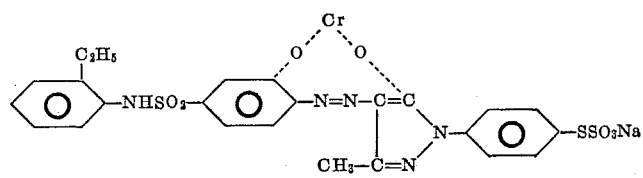
8. The dyestuff of the formula
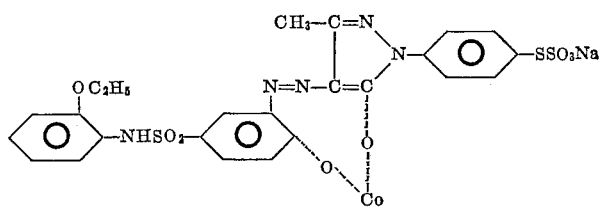
9. The dyestuff of the formula
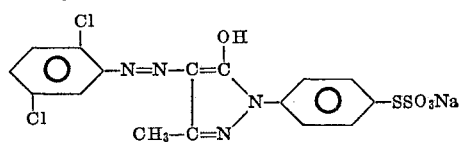
10. The dyestuff of the formula
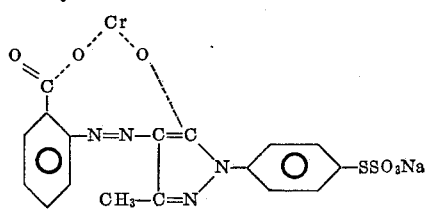
11. The dyestuff of the formula
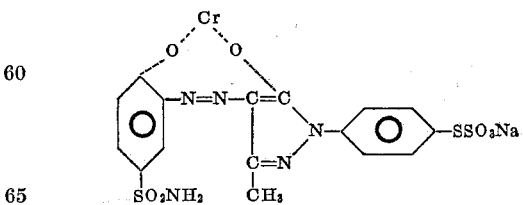
12. The dyestuff of the formula
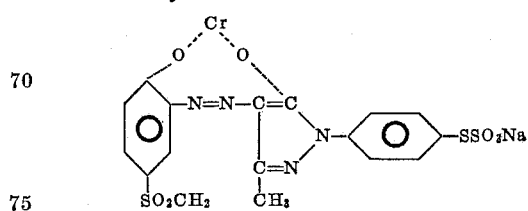

13. The dyestuff of the formula
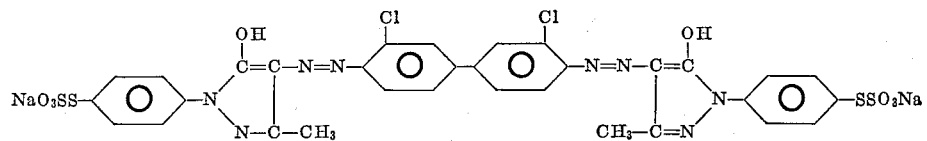
14. A dyestuff as defined in claim 4, and further characterized in that X is methyl; Y is hydrogen; and in that the —$SO_3Z$ group is para to the N attached to the benzene nucleus.
References Cited
UNITED STATES PATENTS
3,088,790 5/1963 Schultheis et al. ____ 260—147 X
3,236,860 2/1966 Schultheis et al. _____ 260—147
FOREIGN PATENTS
1,302,321 7/1962 France.
FLOYD D. HIGEL, *Primary Examiner.*
F. D. HIGEL, *Assistant Examiner.*

UNITED STATES PATENT OFFICE
CERTIFICATE OF CORRECTION

Patent No. 3,346,550    October 10, 1967

Gordon A. Geselbracht

It is hereby certified that error appears in the above numbered patent requiring correction and that the said Letters Patent should read as corrected below.

Column 2, line 52, after the formula, insert -- and --; columns 9 and 10, Ex. No. 21, in the structural formula, insert a bond between the C atoms of the pyrazolone ring; column 14, line 44, for "thees" read -- these --; column 17, Ex. No. 30, in the structural formula of the Azo Dyestuff, insert a bond between the phenyl ring and the N atom of the azo group; columns 17 and 18, Ex No. 32, in the structural formula of the Pyrazolone, for "$OC_3H_5$" read -- $OC_2H_5$ --; Ex. No. 33, in the structural formula of the Azo Dyestuff, for "$SO_2NH$" read -- $SO_2NH_2$ --; columns 19 and 20, Ex. No. 37, in the structural formula of the Azo Dyestuff, for Ex. No. 38, in the structural formula of the Pyrazolone, for "$CH_3O$" read -- $CH_3$ --; columns 21 and 22, Ex. No. 41, in the structural formula of the Azo Dyestuff, insert a bond between the C atoms of the pyrazolone ring; Ex. No. 42, in the structural formula of the Azo Dyestuff, insert a bond between C atom of the pyrazolone ring; Ex No. 43B, in the structural formula of the Pyrazolone, insert a bond between the C atoms of the pyrazolone ring; same columns 21 and 22, Ex. No. 43C, in the structural formula of the Pyrazolone, insert a bond between the C atom of the pyrazolone ring; columns 23 and 24, Ex. No. 43D, in the structural formula of the Pyrazolone, insert a bond between the C atoms of the pyrazolone ring; Ex. No. 43I, in the structural formula of the Azo Dyestuff, insert a bond between the phenyl ring and the N of $NHSO_2$ ; column 25, Ex. No. 43L, the structural formula of the Azo Dyestuff should appear as shown below instead of as in the patent:

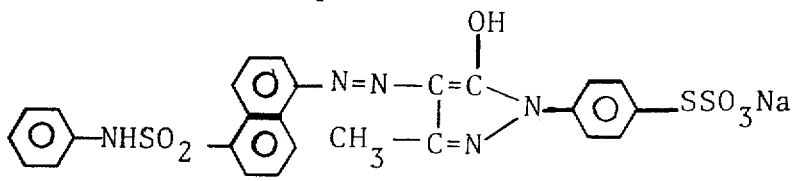

Ex. No. 43M, in the structural formula of the Diazotizable Amine for

   read   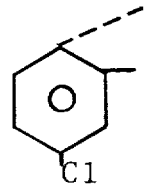

column 27, lines 60 to 68, for that portion of the formula reading

   read   

column 31, lines 4 to 14, for that portion of the formula reading

-N=C-   read   -N=N- column 32, lines 15 to 21, for that portion of the formula reading

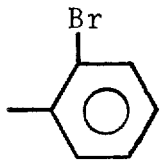   read   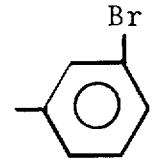

column 43, claim 5, in the structural formula after "$SO_2NHCH_2$" insert a bond through and beyond the right bracket.

Signed and sealed this 29th day of October 1968.

(SEAL)
Attest:

EDWARD M. FLETCHER, JR.
Attesting Officer

EDWARD J. BRENNER
Commissioner of Patents